(12) United States Patent
Warren

(10) Patent No.: US 9,074,366 B2
(45) Date of Patent: Jul. 7, 2015

(54) METHOD OF RETROFITTING A BUILDING

(71) Applicant: Keith Warren, Drayton Valley, CA (US)

(72) Inventor: Keith Warren, Drayton Valley, CA (US)

( * ) Notice: Subject to any disclaimer, the term of this patent is extended or adjusted under 35 U.S.C. 154(b) by 0 days.

(21) Appl. No.: 13/723,619

(22) Filed: Dec. 21, 2012

(65) Prior Publication Data

US 2014/0190120 A1     Jul. 10, 2014

(51) Int. Cl.
| | |
|---|---|
| *E04B 1/00* | (2006.01) |
| *E04B 1/76* | (2006.01) |
| *E04F 13/00* | (2006.01) |
| *E04F 13/074* | (2006.01) |
| *E04G 23/02* | (2006.01) |

(52) U.S. Cl.
CPC .............. *E04B 1/76* (2013.01); *E04F 13/007* (2013.01); *E04F 13/074* (2013.01); *E04G 23/0296* (2013.01); *E04B 1/762* (2013.01)

(58) Field of Classification Search
CPC ......... E04B 1/762; E04B 1/7604; E04B 1/78; E04B 1/007; E04B 1/76; E04F 13/007; E04F 13/074; E04F 13/075; E04F 13/077; E04G 23/0296; E03D 31/02
USPC ............. 52/DIG. 14, 745.06, 745.09, 745.15, 52/741.4, 404.1, 506.1, 506.06, 508, 95, 52/199, 302.3, 302.4
See application file for complete search history.

(56) References Cited

U.S. PATENT DOCUMENTS

| | | | | | |
|---|---|---|---|---|---|
| 2,703,002 | A | * | 3/1955 | Suskind ......................... | 52/302.3 |
| 3,668,829 | A | * | 6/1972 | Nelson .......................... | 52/302.3 |
| 4,191,001 | A | * | 3/1980 | L'Heureux .................. | 52/742.13 |
| 4,342,181 | A | * | 8/1982 | Truesdell ................... | 52/742.13 |
| 4,541,479 | A | * | 9/1985 | Bergeron, Jr. .................. | 165/45 |
| 4,683,692 | A | * | 8/1987 | Tetschner ................... | 52/169.11 |
| 4,875,322 | A | * | 10/1989 | Rozzi ........................... | 52/746.1 |

(Continued)

FOREIGN PATENT DOCUMENTS

| | | |
|---|---|---|
| GB | 2215751 A | 9/1989 |
| GB | 2480853 A | 12/2011 |

(Continued)

OTHER PUBLICATIONS

"Strawbale Foundations and Drainage", http://ww2.whidbey.net/jameslux/sbfounda.htm, pp. 3.

(Continued)

*Primary Examiner* — Robert Canfield
*Assistant Examiner* — Matthew Gitlin
(74) *Attorney, Agent, or Firm* — Davis & Bujold, P.L.L.C.; Michael J. Bujold

(57) ABSTRACT

A method of retrofitting a home includes providing a structural base on a ground surface adjacent to and outside the outer walls, the structural base comprising one or more air passages; installing insulation adjacent to an outer surface of the outer walls, the insulation being supported by the structural base; and installing siding material on an outer surface of the insulation, the siding material and the existing outer walls enclosing the insulation and defining a flow path, a top of the flow path comprising one or more air passages into the attic space such that air flows along the insulation in the flow path between the structural base and the attic space. A plurality of new trusses may be supported at an apex of the existing roof that overhanging the existing outer walls and the insulation, the trusses sloping direction of the slope of the existing roof.

11 Claims, 5 Drawing Sheets

(56) References Cited

U.S. PATENT DOCUMENTS

| | | | |
|---|---|---|---|
| 5,398,472 A | 3/1995 | Eichelkraut | |
| 5,713,696 A * | 2/1998 | Horvath et al. | 405/45 |
| 5,761,864 A * | 6/1998 | Nonoshita | 52/302.3 |
| 5,875,607 A * | 3/1999 | Vohra | 52/741.41 |
| 6,052,959 A * | 4/2000 | LaBrosse | 52/302.6 |
| 6,061,986 A | 5/2000 | Canada | |
| 6,105,335 A * | 8/2000 | Vohra | 52/741.41 |
| 6,301,849 B1 * | 10/2001 | Roth | 52/302.6 |
| 6,494,006 B2 * | 12/2002 | Rainbolt | 52/302.1 |
| 6,584,735 B2 | 7/2003 | Burton | |
| 6,634,144 B1 * | 10/2003 | Moore et al. | 52/169.5 |
| 6,754,997 B2 * | 6/2004 | Bonin | 52/220.1 |
| 7,073,306 B1 | 7/2006 | Hagaman | |
| 7,631,466 B2 | 12/2009 | Black | |
| 7,827,743 B2 * | 11/2010 | Campisi et al. | 52/198 |
| 2003/0051424 A1 * | 3/2003 | Rainbolt | 52/302.1 |
| 2006/0283536 A1 * | 12/2006 | Campisi et al. | 156/71 |
| 2009/0007509 A1 * | 1/2009 | Jordan et al. | 52/302.1 |
| 2010/0175341 A1 * | 7/2010 | Gilbert et al. | 52/302.1 |
| 2011/0056164 A1 * | 3/2011 | Campisi et al. | 52/741.4 |
| 2011/0088338 A1 | 4/2011 | White et al. | |
| 2012/0174511 A1 * | 7/2012 | Harding | 52/302.1 |
| 2012/0260594 A1 * | 10/2012 | Blackstock et al. | 52/302.1 |

FOREIGN PATENT DOCUMENTS

| | | |
|---|---|---|
| WO | 2004101903 A2 | 11/2004 |
| WO | 2010022477 A1 | 3/2010 |
| WO | 2011115806 A2 | 9/2011 |

OTHER PUBLICATIONS

"Strawbale Moisture", http://www.earthbuilding.org.nz/articles/strawmoisture.pdf, pp. 2.
"Straw bale walls", http://www.earthsweethome.com/straw_bale_walls.htm, pp. 3.
"Straw Bale Homes", http://www.peaktoprairie.com/?D=201, pp. 3.
Green Space Collaborative, "Straw Bale Walls", http://www.greenspacecollaborative.com/straw-bale-plaster/, accessed Jul. 11, 2013, pp. 2.
International Search Report issued in corresponding International Application No. PCT/CA2013/050910 mailed on Mar. 19, 2014.

* cited by examiner

METHOD OF RETROFITTING A BUILDING

FIELD

This relates to retrofitting a building, such as a house, to increase the insulation of the building.

BACKGROUND

As concerns over energy use increase, attempts are made to improve building insulation. Improved insulation is easily achieved using new products and construction techniques in new building constructions. However, many older buildings are left with only light insulation in their walls and ceilings as the effort and cost involved in re-insulating a home is significant.

One known, natural insulation material is straw bales. These bales are readily available in many agricultural areas at a reasonable cost and some new homes are constructed using bales. However, care must be taken when incorporating these materials into a building as bales containing organic material are subject to rot.

The bales may be made from various materials and are generally cellulose materials such as straw. Cellulose materials are useful as they are generally light with relatively high insulative properties and are readily available in areas with an agriculture industry.

As used herein, the term bale is used to refer to the smaller square bales, as opposed to the round or larger square bales. The dimensions of these bales may vary depending on the equipment used and the preferences of the user. Most bales are between 12 to 24 inches wide and tall (although not necessarily the same, e.g. 14×18 inches), between 24 to 40 inches long, and are often held together by 2 or 3 strands of twine. Each bale may weigh between 25-35 pounds. Bales may be formed in various dimensions and various weights outside these ranges as well, as is known in the art, where the limits on size are based on practical concerns related to their intended use. The weight may vary based on the density of the bale, or how much they are compacted by the baler. The size may be adjusted based on the baler being used and the operator controls. It will be understood that, as the dimensions will affect the thickness of the wall, that appropriate dimensions should be chosen to ensure consistency and utility.

SUMMARY

There is provided a method of retrofitting a building having outer walls and a roof supported above the outer walls, the roof defining an attic space. The method comprises the steps of: providing a structural base on a ground surface adjacent to and outside the outer walls, the structural base comprising one or more air passages; installing insulation on the structural base, the insulation being adjacent to an outer surface of the outer walls; and installing siding material on an outer surface of the insulation, the siding material and the existing outer walls enclosing the insulation and defining a flow path, a top of the flow path comprising one or more air passages into the attic space such that air flows along the insulation in the flow path between the structural base and the attic space.

According to an aspect, air flow through the flow path may be induced as the air is heated at least one of within the attic and the flow path.

According to an aspect, the structural base may comprise structural blocks. The structural blocks may be spaced along the ground surface out from the existing wall, and the structural base may comprise granular material retained between the structural blocks and the existing wall.

According to an aspect, the insulation may comprise bales of cellulose material.

According to an aspect, installing siding may comprise installing siding anchors supported by the insulation According to an aspect, the siding may comprise stucco, and may further comprise the steps of installing strapping and mesh using the siding anchors to support the stucco.

According to an aspect, the method may further comprise the steps of: removing a window from an existing window opening of the building; securing a window support to the roof such that the window support is aligned with the existing window opening and such that the window support is structurally supported by the roof; installing a window in the window support; and installing the insulation against an outer surface of the existing outer walls and around the window support.

There is further provided a method of retrofitting a building having existing outer walls and an existing roof comprising existing trusses and existing roofing supported by the trusses, the method comprising the steps of: installing insulation adjacent to an outer surface of at least one existing outer wall of the building; supporting a first end of a plurality of trusses at an apex of the existing roof, a second end of the plurality of trusses overhanging the at least one existing outer wall and the insulation, the trusses being supported such that the trusses slope downward in from the apex of the existing roof, the slope of the trusses being in the direction of and less than the slope of the existing roof; and installing roofing on the plurality of trusses to cover at least a portion of the existing roofing of the building.

According to an aspect, the method may further comprise the step of removing a portion of the existing roofing to expose a top of the outer wall of the building.

According to an aspect, the method may further comprise the step of installing truss supports between the truss and the top of the outer wall.

According to an aspect, the method may further comprise the step of installing a layer of attic insulation within an attic space defined by the existing roof and extending past the removed portion of the existing roofing.

According to an aspect, the method may further comprise the step of installing a soffit between the insulation and the trusses.

According to an aspect, the insulation may be installed before or after the plurality of trusses.

According to an aspect, the insulation may be a bale of cellulose material.

According to an aspect, installing insulation adjacent to an outer surface of at least one existing outer wall of the building further may comprise the steps of: providing a structural base on a ground surface adjacent to and outside the at least one outer wall, the structural base comprising one or more air passages; installing insulation on the structural base, the insulation being adjacent to an outer surface of the outer walls; and installing siding material on an outer surface of the insulation, the siding material and the existing outer walls enclosing the insulation and defining a flow path, a top of the flow path comprising one or more air passages into the attic space such that air flows along the insulation in the flow path between the structural base and the attic space.

According to an aspect, the method may further comprise the steps of: removing a window from an existing window opening of the building; securing a window support to the roof such that the window support is aligned with the existing window opening and such that the window support is structurally supported by the roof; installing a window in the window support; and installing the insulation against an outer surface of the existing outer walls and around the window support.

There is further provided a method of retrofitting a building having outer walls, a window and a roof, the method comprising the steps of: removing the window from an existing window opening in an outer wall; securing a window support to the roof such that the window support is aligned with the existing window opening and such that the window support is structurally supported by the roof; installing a window in the window support; and installing insulation against an outer surface of the existing outer walls and around the window support.

According to an aspect, the installed window may be one of the removed window and a new window.

According to an aspect, the method may further comprise the steps of installing the roof over an existing roof by: supporting a first end of a plurality of trusses at an apex of the existing roof, a second end of the plurality of trusses overhanging the outer wall, the trusses being supported such that the trusses slope downward from the apex of the roof, the slope of the trusses being less than a slope of the underlying roof; and installing roofing on the plurality of trusses to cover the roof of the building.

According to an aspect, the window support may be secured one or more of the plurality of trusses.

According to an aspect, the method may further comprise the step of installing siding material on an outer surface of the insulation, the siding material and the existing outer walls enclosing the insulation and defining a flow path, a top of the flow path comprising one or more air passages into the attic space such that air flows along the insulation in the flow path between the structural base and the attic space.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

There will now be described a method of retrofitting a building to increase its insulation. Generally speaking, the method involves three parts: installing insulation, increasing the size of the roof, and installing windows at an appropriate position within the retrofitted walls. It is generally anticipated that all walls will be insulated, and the description below will be given with this in mind. However in some circumstances only one or more walls may be insulated, such as an attached garage or other annex that is not to be insulated, and in that case, modifications that will be recognized by those skilled in the art may be required without departing from the principles of construction described below.

As described herein, the insulation is preferably made from bales of cellulose material, such as hay, grass, straw, or other similar materials that can be banded together in a bale. Such bales are known to have strong insulative properties, and are relatively inexpensive, particularly in areas with a strong agriculture industry. Many baling machines can be adjusted to produce bales with a range of densities and sizes, allowing them to be produced in an appropriate density and size to meet the construction specifications required by the builder. One concern with using these types of bales as insulation is that they are generally made from organic material that is subject to mold and rot when exposed to moisture for prolonged periods of time. Accordingly, the insulation is preferably installed in such a manner that air is circulated through the bales, as will be described below.

Various aspects of installing the insulation will now be described. It will be understood that not all aspects will be required in all circumstances, and some aspects may be applied in other situations that do not involve retrofitting a building with bales to increase insulation. Furthermore, the order of these steps may vary depending on the preferences of the user, the scope of the project and the steps that are actually being taken. In addition, it will be understood that some steps may be used in construction projects that do not use bales as the additional layer of insulation.

Installing Insulation

Figure 1:
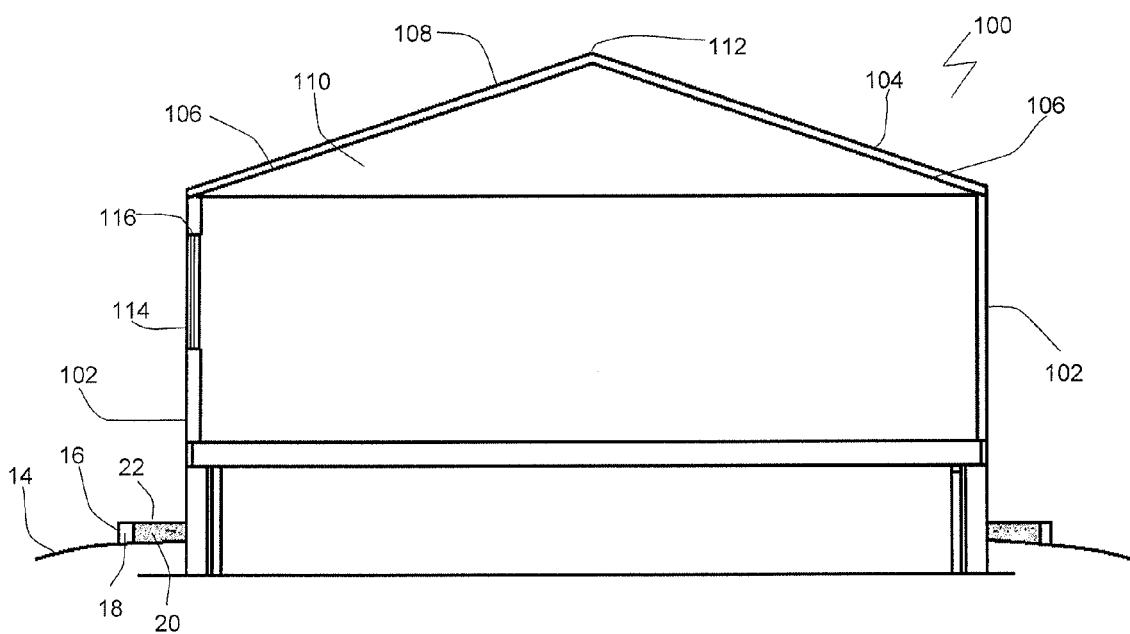
FIG. 1 is a side elevation view in section of a building with a structural base for a new layer of insulation.

Referring to FIG. 1, there is shown a building 100 to be retrofitted with insulation. Building 100 has outer walls 102, a roof 104 with trusses 106 and roofing material 108 that defines an attic space 110, and an apex 112. Building 100 also has windows 114 in existing window boxes 116, as well as other common elements that are not shown, such as doors, vents, chimneys, etc. As shown, building 100 is a single family dwelling, although the steps described herein may be used to retrofit other types of buildings as well.

Preferably, the ground 14 around building 100 is sufficiently settled to allow it to be used as a structural base without a significant amount of preparation. For example, if building 100 is one that has been in place for over 25 years, the ground will generally be undisturbed soil. Certain steps to strengthen the base or further stabilize the ground may be taken if the ground is not sufficiently stable.

Referring to FIG. 1, a structural base 16 is installed on ground 14. In one example, structural base 16 is preferably installed directly on ground 14 and is made up of discrete structural blocks 18 (shown in FIG. 4) spaced from outer walls 102. The space between structural blocks 18 and outer walls 102 is filled with a granular material 20, such as washed rock or the like. A screen 22 or other substrate is preferably placed over the top of granular material 20 that restricts the movement of insects and other pests, but that permits a sufficient amount of air movement. If ground 14 is not sufficiently stable, it may be necessary to provide another base (not shown), such as a concrete pad that may be below, or formed as part of base 16.

Figure 4:
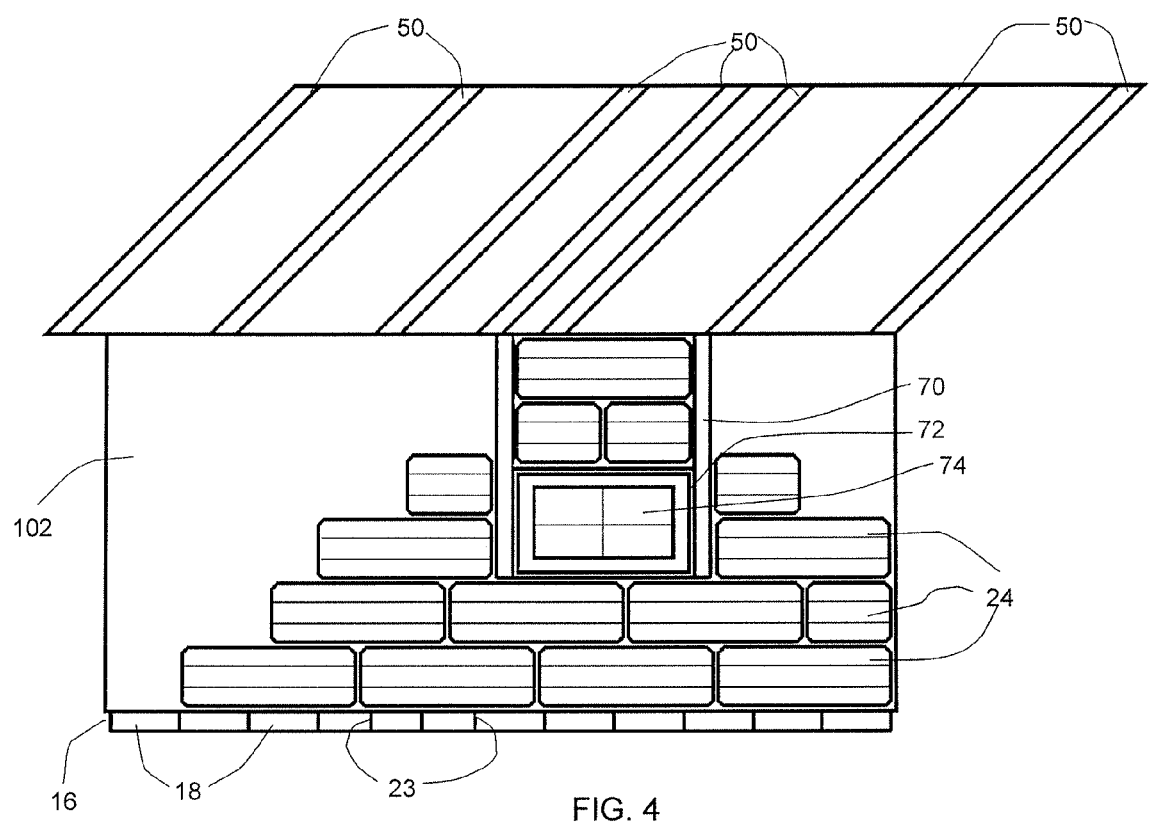
FIG. 4 is a front elevation view of a wall of a building with a window.

Preferably, referring to FIG. 4, structural base 16 has air flow channels 23, such as by installing blocks 18 loosely along their length to form air flow channels 23 between adjacent blocks 18. Generally speaking, air flow channels 23 will be along a front face of blocks 18, and allow air to flow to the insulation that will be described below. The size of air flow channels 23 may be determined by the size of blocks 18, i.e. the spacing between blocks 18 and the amount of air flow required. In one example, it was found that the natural spacing of common cast concrete blocks with their inherently rough end surfaces placed side by side provided sufficient airflow through structural base 16. Air flow channels 23 may also be formed in other ways, such as by forming holes in structural blocks 18, or periodically replacing structural blocks 18 with screened blocks (not shown) or other types of openings. Other designs for structural base 16 will be recognized by those skilled in the art, and in particular, designs that allow air to flow from the atmosphere outside building 100 and through structural base 16.

Figure 2:
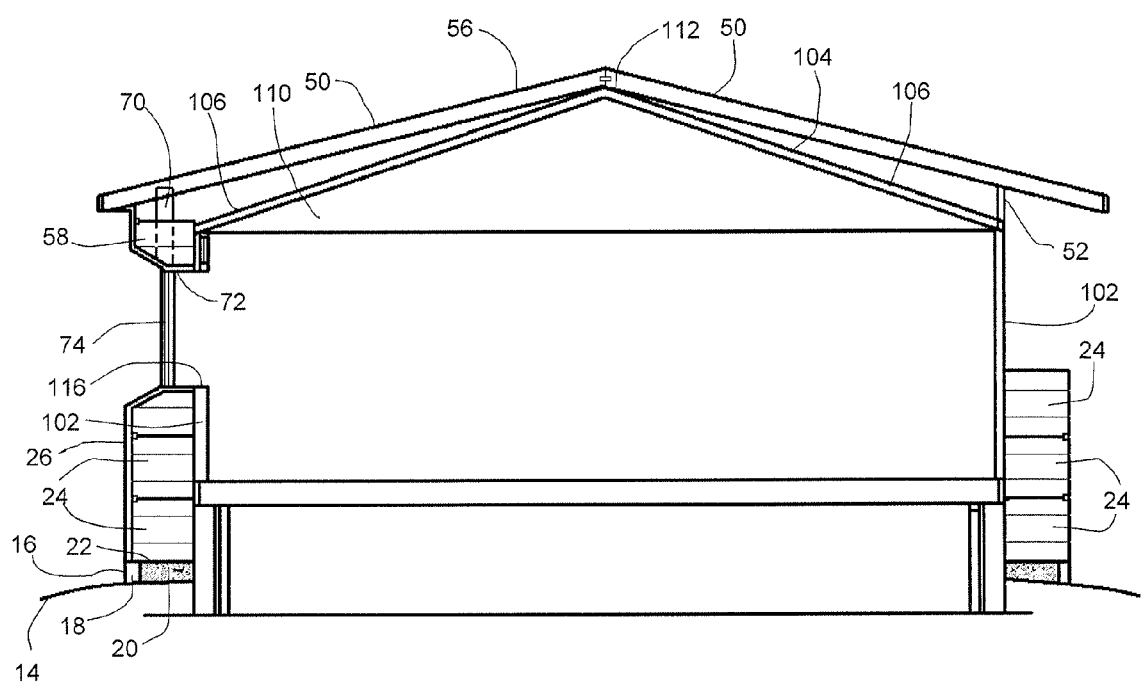
FIG. 2 is a side elevation view in section of a building with a new roof and a new layer of insulation partially installed.

Referring to FIGS. 2 and 4, once structural base 16 is installed, bales 24 are installed by stacking them in rows immediately adjacent to outer walls 102. In homes where the basement extends up from ground surface 14, structural base 16 may be positioned adjacent to the basement and bales 24 may also overlie the basement walls as well as the upper, or main floor of building 100. Preferably, bales 24 in adjacent rows are offset from those immediately below to increase stability. Structural members (not shown) may be inserted through bales 24 vertically or horizontally to also increase the stability of stacked bales 24. A baler may be used on site to produce bales of a desired size, which may be necessary to either complete a row, or when working around a feature, such as a window or door frame. Other techniques may also be used, such as opening a bale and manually binding a portion of it to achieve the desired size. As shown in FIG. 4, different sizes of bales 24 may be required, such as the edges of building 100, or around window support 70 or door frame (not shown). Preferably, bales at the edges of building 100 will overlap and interlock with bales on an adjacent side of building 100, such that they tie together and provide structural support. Generally, bales 24 will be stacked with the cut sides being oriented vertically, i.e. with the banded sides facing outward. As it is known to install bales 24 to insulate homes, those skilled in the art will be familiar with the various techniques that may be used when installing bales 24, and these will not be described in any further detail.

Siding Installation

Figure 3:
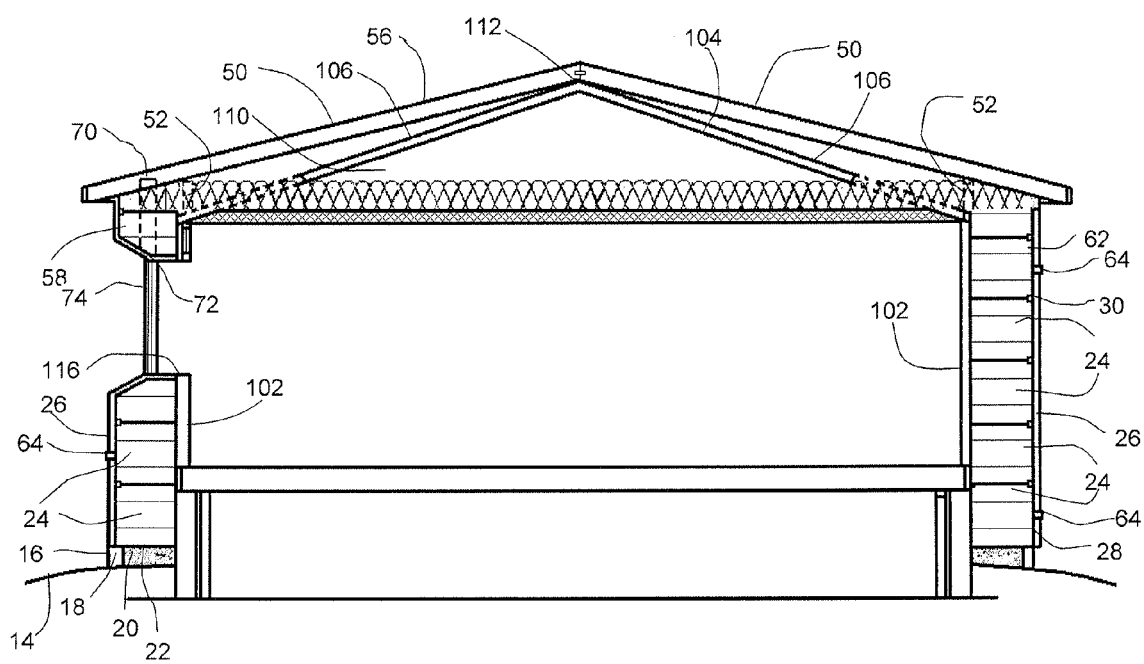
FIG. 3 is a side elevation view in section of a retrofitted building.

Referring to FIG. 3, once insulation, or bales 24 are installed, it is necessary to install siding 26 to finish the walls and protect bales 24 from the elements. Siding 26 may be stucco, vinyl, or other suitable type of siding. The example herein will describe stucco, as it has been found that stucco works well in hiding any flaws due to the uneven surface of bales 24.

Figure 5:
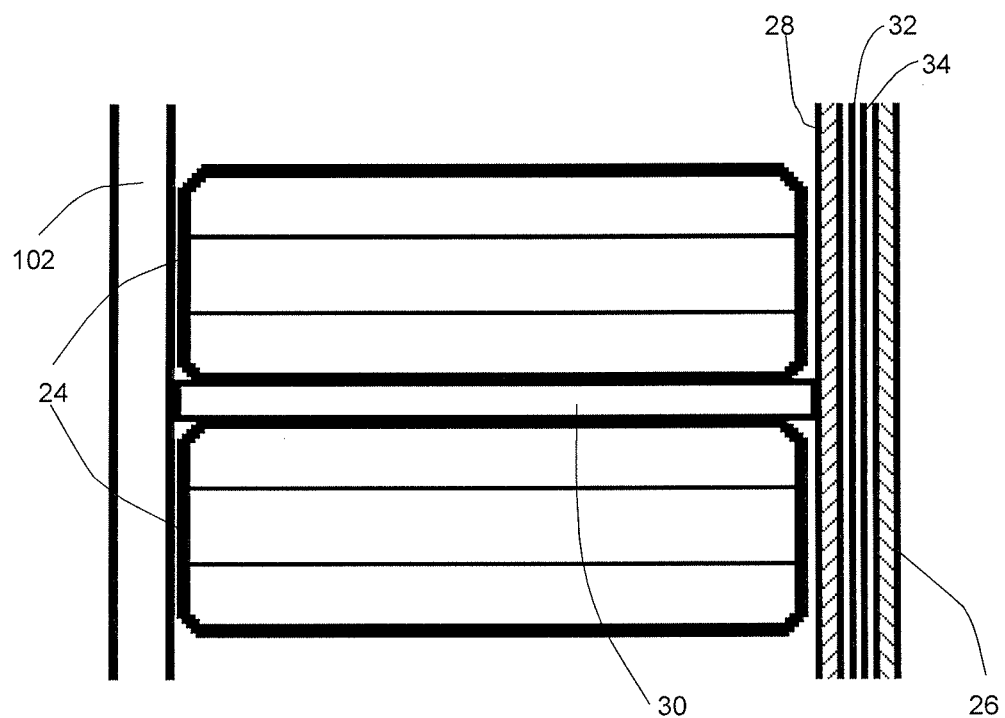
FIG. 5 is a detailed side elevation view of siding being installed on a building.

Referring to FIG. 5, in order to anchor siding 26, anchors 30 are inserted between rows of bales 24, and securely fastened to the existing wall, and strapping 28 is attached vertically to anchors 30. Anchors 30 are preferably inserted through bales 24 and anchored to existing wall 102, but in some circumstances may be frictionally held or otherwise anchored between bales 24. Anchors are strong enough and held securely enough to support strapping 28 and siding 26. Anchors 30 will be spaced sufficiently close together to provide sufficient support to strapping 28. In one example, anchors 30 were about 1½" thick, such that the weight of bales 24 was able to grip anchors 30. Anchors 30 may have protrusions (not shown) that extend into bales 24. Strapping 28 is generally between 2-3" wide and relatively thin, such as 0.75", to avoid unnecessarily increasing the size of the new walls. Other sizes of strapping 28 or support structures may also be used. Anchors 30 and strapping 28 are spaced sufficiently close to provide the necessary structural support for siding 26. A layer of construction wrap 32 is also installed over or under strapping 28. In practice, construction wrap 32, such as Tyvek®, plus one or more layers of building paper (not shown) in addition to the construction wrap are is used to weatherproof and protect bales 24 from the elements. Stucco siding 26 may then be applied to mesh layer 34 using known techniques, which may include a layer of mesh 34 that is installed and supported by strapping 28.

Roof Installation

As an additional layer if insulation is installed around existing walls 102, the size of roof 104 may not be sufficient to cover the new thickness. In this case, roof 104 must be adjusted to account for this. Referring to FIG. 3, roof 104 is preferably modified by cutting back on roofing material 108 between and from trusses 106 to permit access to the structural components of existing roof 104. New trusses 50 are then installed by placing one end at the apex 112 of roof 104, and having the other end extend out past walls 102 and insulation 24. New trusses 50 are preferably secured by providing truss supports 52 supported by structural components of building 100, such as existing trusses 106, walls 102, etc. as the case may be, that extend up and engage new trusses 50. Additional supports may be installed as necessary between apex 112 and truss supports 52, depending on the size of building 100 and the slope of new trusses 50 as is known in the art. New trusses 50 extend out in the same direction as existing trusses 106, but necessarily have a slope or pitch that is less than the slope or pitch of existing roof 104. New roof 56 is then finished as would be a normal roof, with soffits 58, vents, chimneys, etc. (not shown) as the case may be.

Existing roof 104 may take various forms, and it will be understood that the method will necessarily be adjusted accordingly. In a simple case, roof 104 will slope away in one or two directions, in which case the apex will be considered the highest point of roof 104, which extends along the length or width of building 100, as the case may be. In another case, roof 104 may slope away from an apex in four directions, such that there will be four lines of intersections sloping away from the apex. In that situation, reference to the "apex" in the discussion above may include these lines of intersection as well with new trusses 50 intersecting at and sloping away from these lines of intersection as well. It will be understood that, in this situation, new trusses 50 that intersect along these lines of intersection. Generally speaking, new trusses 50 will follow the original shape of existing roof 104, except that the slope is reduced in order to increase the reach beyond existing walls 102 to cover insulation 24. For some roofs, such as "barn-style" roofs where the slope changes, new trusses 50 may be designed to change slope as well, or may be straight with a single slope. Those skilled in the art will understand how to adapt the construction principles described above to accommodate the various types of roofs that may be encountered.

New roof 56 is designed such that new trusses 50 overhang existing wall 102 and insulation 24 by a sufficient amount to provide adequate protection, and as required by building regulations. It may be possible that only a portion of roof 104 requires the additional extension, such as if not all walls are insulated, in which case trusses 50 may only be installed over the relevant portion of roof 104.

Referring to FIG. 3, when installing new roof 56, the insulation in attic space 110 may also be increased. Assuming it is structurally sound and properly installed, existing insulation 112 in attic space 110, including the vapour barrier, may be left undisturbed, and new insulation 60 may be installed by overlaying it onto existing insulation 112. As new roof 56 extends out past existing walls 102, new insulation 60 also preferably extends out as well, while not preventing air flow through soffits 58 or up through the new walls, as will be described below. As mentioned above with respect to supporting new trusses 50, a portion of existing roofing 108 is preferably removed to facilitate this. Another advantage of this is that new insulation 60 is able to extend past existing walls 102 to properly insulate under new roof 56 and over the entire new bale cladding.

Window Installation

When retrofitting a home, it is also necessary to allow for openings such as windows and doors. Referring to FIG. 1, the first step is to remove the existing window 114 from the existing window box 116. Referring to FIG. 4, a new window support 70 is provided that supports a new window box 72 and new window 74. New window 74 is preferably a more energy efficient window compared to what was removed, although the removed window may also be replaced to avoid the cost of a new window. Referring to FIG. 3, new window box 72 is also attached to existing window box 116 to provide for continuity in the wall as well as stability, however, to avoid a cantilevered structure, new window support 70 is used to vertically support new window box 72 by extending down from either new trusses 50 of new roof 56, or existing roof 104 if permitted by the size of existing roof 104. As depicted in FIG. 4, an additional truss 50 has been added adjacent to window support 70 to allows window support 70 to be appropriately secured.

Doors (not shown) may be supported by the ground surface and the existing frame in walls 102. The steps described above with respect to windows may also be used to provide additional vertical support to the doors.

Moisture Control

As mentioned previously, one concern with using organic, cellulose material as insulation it its susceptibility to damage due to moisture. Accordingly, the installation of bales 24 is preferably done within an air channel 62 that permits a steady or at least periodic flow of air through bales 24. As shown, air channel 62 is formed by existing outer walls 102 on one side, and siding 26 on the other. Air channel 62 is open at the bottom in structural base 16, which is designed to permit air flow as described above, and is open at the top into attic space 110 under new roof 56. Construction guidelines require air flow through attic spaces 110, such that there is already a natural flow of air from attic space 110. Air channel 62 as described combines with this to provide a flow of air up through insulation bales 24 from structural base 16 into attic space 110. This current is provided as the air in attic 110 will generally be at a lower pressure at the top of bales 24 than the air in insulation bales 24, and this will draw air up through air channel 62.

In addition to providing air channel 62, moisture test ports 64 may be provided, with access from either outside building 100 as shown, or from inside. Moisture test ports 64 are sealed when not in use, but open to provide access to bales 24 and are sufficiently large to allow a humidity sensor (not shown) to be inserted. Test ports 64 may be provided a various strategic locations to allow the moisture content in bales 24 to be tested. If it is found that there is too much moisture, a forced air unit may be used to draw air out of attic 110 or air may be pumped in through moisture test ports 64 to increase the flow of air through air channel 62 and reduce the moisture content in bales 24.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of retrofitting a building having outer walls and a roof supported above the outer walls, the roof defining an attic space, the method comprising the steps of:
   providing a structural base on a ground surface adjacent to and entirely outside an outer perimeter of the outer walls, the structural base being structurally isolated from the outer all the structural base comprising one or more air passages;
   installing insulation on the structural base, the insulation being adjacent to an outer surface of the outer walls;
   installing siding material on an outer surface of the insulation, the siding material and the existing outer walls defining a flow path, the insulation being enclosed within the flow path, a top of the flow path comprising one or more air passages into the attic space such that air flows through the structural base, through the insulation in the flow path and into the attic space.

2. The method of claim 1, wherein air flow through the flow path is induced as the air is heated at least one of within the attic and the flow path.

3. The method of claim 1, wherein the structural base comprising structural blocks.

4. The method of claim 3, wherein the structural blocks are spaced along the ground surface out from the existing wall, and the structural base comprising granular material retained between the structural blocks and the existing wall.

5. The method of claim 1, wherein the insulation comprises bales of cellulose material.

6. The method of claim 1, wherein installing siding comprises installing siding anchors supported by the insulation.

7. The method of claim 6, wherein the siding comprises stucco, and further comprising the steps of installing strapping and mesh using the siding anchors to support the stucco.

8. The method of claim 1, further comprising the steps of:
   removing a window from an existing window opening of the building;
   securing a window support to the roof such that the window support is aligned with the existing window opening and such that the window support is structurally supported by the roof;
   installing a window in the window support; and
   installing the insulation against an outer surface of the existing outer walls and around the window support.

9. The method of claim 1, wherein the one or more air passages in the structural base are directly open to exterior ambient air.

10. The method of claim 1, wherein the structural base is provided at grade on a top surface of the ground surface.

11. The method of claim 1, wherein the siding material comprises a layer of weatherproofing material.

* * * * *